US008705666B2

(12) United States Patent
Thian et al.

(10) Patent No.: US 8,705,666 B2
(45) Date of Patent: Apr. 22, 2014

(54) DECODING FOR MIMO SYSTEMS

(75) Inventors: Boon Sim Thian, Stanford, CA (US); Andrea Goldsmith, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 180 days.

(21) Appl. No.: 13/079,739

(22) Filed: Apr. 4, 2011

(65) Prior Publication Data

US 2011/0243279 A1 Oct. 6, 2011

Related U.S. Application Data

(60) Provisional application No. 61/320,662, filed on Apr. 2, 2010.

(51) Int. Cl.
*H04L 27/06* (2006.01)

(52) U.S. Cl.
USPC ........... 375/340; 375/341; 375/262; 375/265; 714/794; 714/795

(58) Field of Classification Search
USPC ........... 375/340, 341, 262, 265; 714/786–796
See application file for complete search history.

(56) References Cited

U.S. PATENT DOCUMENTS

| | | | | |
|---|---|---|---|---|
| 5,872,816 A * | 2/1999 | Parr et al. | | 375/341 |
| 6,442,130 B1 * | 8/2002 | Jones et al. | | 370/208 |
| 7,395,493 B2 * | 7/2008 | Ahmed et al. | | 714/795 |
| 2003/0058787 A1 * | 3/2003 | Vandenameele-Lepla | ... | 370/206 |
| 2004/0028154 A1 * | 2/2004 | Yellin et al. | | 375/341 |
| 2007/0217536 A1 * | 9/2007 | Choi | | 375/262 |
| 2010/0157785 A1 * | 6/2010 | Song et al. | | 370/203 |

OTHER PUBLICATIONS

Foschini, et al., "ON limits of wireless communications in a fading environment when using multiple antenna", Wireless Personal Communication, vol. 6, No. 3, pp. 311-335, Mar. 1998.
Health, et al.,"Antenna selection for spatial multiplexing systems with linear receivers", IEEE Communication Letters, vol, 5, No. 4, pp. 142-144, Apr. 2001.
Hassibi, et al., "How much training is needed in multiple-antenna wireless links?" IEEE communication Letters, vol. 5, No. 4, pp. 142-144, Apr. 2001.
Biguesh, et al., "Training based MIMO channel estimation: A study of estimator tradeoffs and optimal training signals", IEEE Trans. Signal Processing, vol. 54, No. 3, pp. 884-893, Mar. 2006.

(Continued)

*Primary Examiner* — Daniel Washburn
*Assistant Examiner* — Rahel Guarino
(74) *Attorney, Agent, or Firm* — Mintz Levin Cohn Ferris Glovsky and Popeo, P.C.

(57) ABSTRACT

In one aspect there is provided a method. The method may include receiving a signal transmitted through a channel; receiving an estimate of the channel; determining from the estimate of the channel at least one statistic representative of a variability of the estimate of the channel; decoding the received signal by at least searching for an output using a plurality of cost metrics determined based on at least the estimate of the channel and the at least one statistic; and providing, based on at least one of the plurality of cost metrics, the output. Related apparatus, systems, methods, and articles are also described.

19 Claims, 5 Drawing Sheets

(56) References Cited

OTHER PUBLICATIONS

Shahbazpanahi, et al., "Closed-form blind MIMO channel estimation for orthogonal space-time block codes", IEEE Trans. Signal Processing, vol. 53, No. 12, pp. 4506-4517, Dec. 2005.

Tugnait, et al., "Blind channel estimation and equalization of multiple-input and multiple-output channels", Proceedings of IEEE Int. Conf. on Personal Wireless Comms., pp. 231-235, Feb. 1999.

Yatawatta, et al., "Blind channel estimation in MIMO-OFDM systems", Proceedings of IEEE workshop on Statistical Signal Processing, pp. 363-366, Sep. 2003.

Taricco et al., "Space-time decoding with imperfect channel estimation", IEEE Trans. Wireless Comms., vol. 4, No. 4, pp. 1874-1888, Jul. 2005.

Li et al., "Robust optimization of linear precoders/decoders for multiuser MIMO downlink with imperfect CSI at base station", IEEE WCNC 2007, pp. 1130-1134, Mar. 2007.

P-Iserte, et al., "A robust maximum approach for MIMO communications with imperfect cannel state information based on convex optimization", IEEE Trans. Signal Processing, vol. 54, No. 1, pp. 346-360, Jan. 2006.

Farhoodi, et al., "Robust ML detection algorithm for MIMO receivers in presence of channel estimation error", IEEE PIMRC, 2006.

Liang et al., "Dynamic QRDM receivers for MIMO beamforming systems with imperfect channel state information", IEEE ICICS 2005, pp. 801-805, Dec. 2005.

Chen, et al., "ZF V-Blast for imperfect MIMO channels using average performance optimization", IEEE ICASSP 2007, pp. 141-144, 2007.

Whang, et al., "An adaptive space-time receiver for time-varying channel with imperfect channel estimation", IEEE WCNC 2008, pp. 1-5, Oct. 2008.

Wang, et al., "Robust transmission for multiuser MIMO downlink systems with imperfect CSIT", IEE WCNC 20087, pp. 340-344, Oct. 2008.

Boyd, et al., "Convex optimization", Cambridge University Press, 2004.

Golub, et al., "Matrix Computations", John Hopkins Univ. Press, 3rd. ed., 1996.

Fincke, et al., "Improved method for calculating vector of short length in a lattice, including a complexity analysis", Math Comput., vol. 44, pp. 463-471, Apr. 1985.

Viterbo, et al., "A universal lattice decoder for fading channels", IEEE Trans. Info. Theory, vol. 45, No. 5, Jul. 1999.

Damen, et al., "Lattice code decoder for space-time codes", IEEE Comm. Letters, pp. 161-163, May 2000.

Thian et al., "Decoding for MIMO systems with imperfect channel state information", Global Telecommunications Conference (GLOBECOM 2010), 2010 IEEE.

* cited by examiner

DECODING FOR MIMO SYSTEMS

CROSS-REFERENCE TO RELATED APPLICATIONS

This application claims the benefit of U.S. provisional patent application Ser. No. 61/320,662, filed on Apr. 2, 2010 and entitled "Robust Decoding for MIMO Systems Having Imperfect Channel State Information," which is incorporated by reference herein in its entirety.

FIELD

The subject matter described herein relates to multiple-input multiple-output (MIMO) wireless communications.

BACKGROUND

Multiple-input multiple-output (MIMO) wireless communication systems utilize multiple transmit antennas and multiple receive antennas instead of a single antenna. MIMO systems often have multiple transmitters (e.g., one associated with each transmit antenna) and multiple receivers (e.g., one associated with each receive antenna). Each received signal is demodulated and often further processed by a decoder.

SUMMARY

The subject matter disclosed herein provides methods and apparatus, including computer program products for decoding.

In one aspect there is provided a method. The method may include receiving a signal transmitted through a channel; receiving an estimate of the channel; determining from the estimate of the channel at least one statistic representative of a variability of the estimate of the channel; decoding the received signal by at least searching for an output using a plurality of cost metrics determined based on at least the estimate of the channel and the at least one statistic; and providing, based on at least one of the plurality of cost metrics, the output.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

Figure 1:
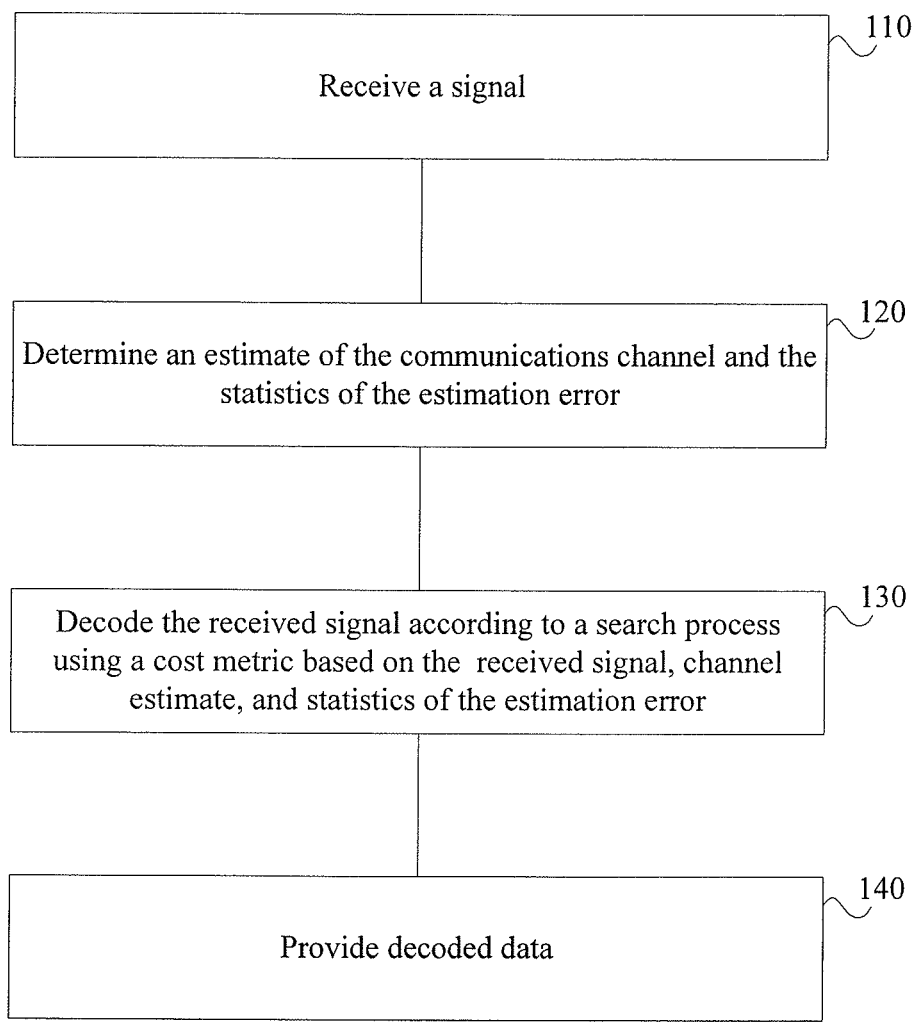
FIG. 1 depicts an example of a process for decoding based on a cost metric.

Like labels are used to refer to same or similar items in the drawings.

DETAILED DESCRIPTION

FIG. 1 depicts a process 100 for decoding a received signal based on a search process and/or a cost metric. At 110, the receiver, as further described below with respect to FIG. 2, receives a signal. At 120, an estimate of the channel and the statistics of the estimation error are determined. At 130, the signal is demodulated and then decoded using a search process and/or the cost metric. For example, the received signal may be decoded based on cost metrics determined to enable a search for decoded data representative of what was transmitted by a transmitter and then received at 110 as the received signal 110. At 140, the receiver provides the decoded data as an output.

At 110, the receiver may receive a signal. The received signal may be transmitted by another device, such as a wireless base station, wireless access point, wireless mobile device, and the like. Moreover, the received signal may be an analog signal, a digital signal, or a combination of both. In some implementations, the received signal is configured in accordance with MIMO, although signals other than MIMO may be used as well. The received signal may also be configured in accordance with one or more wireless standards. For example, the received signal may be configured to substantially comply with a standard system specification, such as, for example, WiFi, WiMAX, Long Term Evolution (LTE), LTE-Advanced, other commercial wireless standards, and/or proprietary standards. Moreover, the received signal may carry one or more of voice, video, images, data, control information, and any other information.

At 120, an estimate of the channel and the statistics of the estimation error may be determined. The estimate of the channel may include determining an estimate of the channel that carried the received signal. For example, the channel estimate may include determining an estimate at any given instant of time. This estimate of the instantaneous channel may thus estimate channel state information and/or the response of the radio channel between the transmitter and the receiver at any given instant of time. The estimate of the instantaneous channel may be determined by, for example, utilizing training sequences, blind estimation techniques, and any other technique as well. The statistics of the estimation error of the channel estimate may also be determined. These statistics of the estimation error may include an indication of the variability of the channel estimate. Examples of the statistics of the estimation error may include the mean and variance of the estimation error.

At 130, the received signal may be decoded at the receiver based on a search process and a cost metric. The cost metric may be determined based on the estimate of the instantaneous channel as well as the statistics of the estimation error determined at 120. For example, the receiver may decode the received signal by calculating one or more cost metrics for paths through a decision tree and choose the best path according to a goal using the search process further described below. The cost metric reflects a measure of "goodness" in choosing a particular path though the decision tree. A path with a cost metric value that is lower may have more "goodness" than a path with a higher value cost. Examples of cost metrics include distance metrics, other path metrics, and a nodal metric function, which is described further below. The decision tree is a graphical illustration of the calculations (e.g., decisions) a decoder at the receiver makes when decoding the received signal. The search process performed by the decoder 240 uses one or more cost metrics to evaluate possible paths through the decision tree, and then chooses the best path as the one that minimizes the cost metric value. In other words, the search process minimizes the cost metric through the decision tree over a set of possible paths through the decision tree to determine a so-called "maximum likelihood" solution. The maximum likelihood solution thus represents the most likely series of symbols carried by the received signal 105, which was sent by the transmitter. This most likely series of symbols may then be selected as the decoded output data of the decoder at the receiver. Examples of search processes which may be performed at the decoder may include the best-first search, breadth-first search and depth-first search and others.

In some implementations, the decoding performed at the receiver enables the receiver, such as a MIMO receiver, to decode the signal transmitted in accordance with MIMO, when the channel state information is not available and/or imperfect.

At 140, the receiver provides, based on the decoding performed at 130, decoded data, such as symbols, data sequences, and the like, For example, the maximum likelihood solution decoded at 130 may represent a so-called "best" estimate of what was transmitted by a transmitter and received as the received signal at 110. In some implementations, the decoded data may be provided to another component and/or device, such as a computer, a display, a storage device, and the like.

Figure 2:
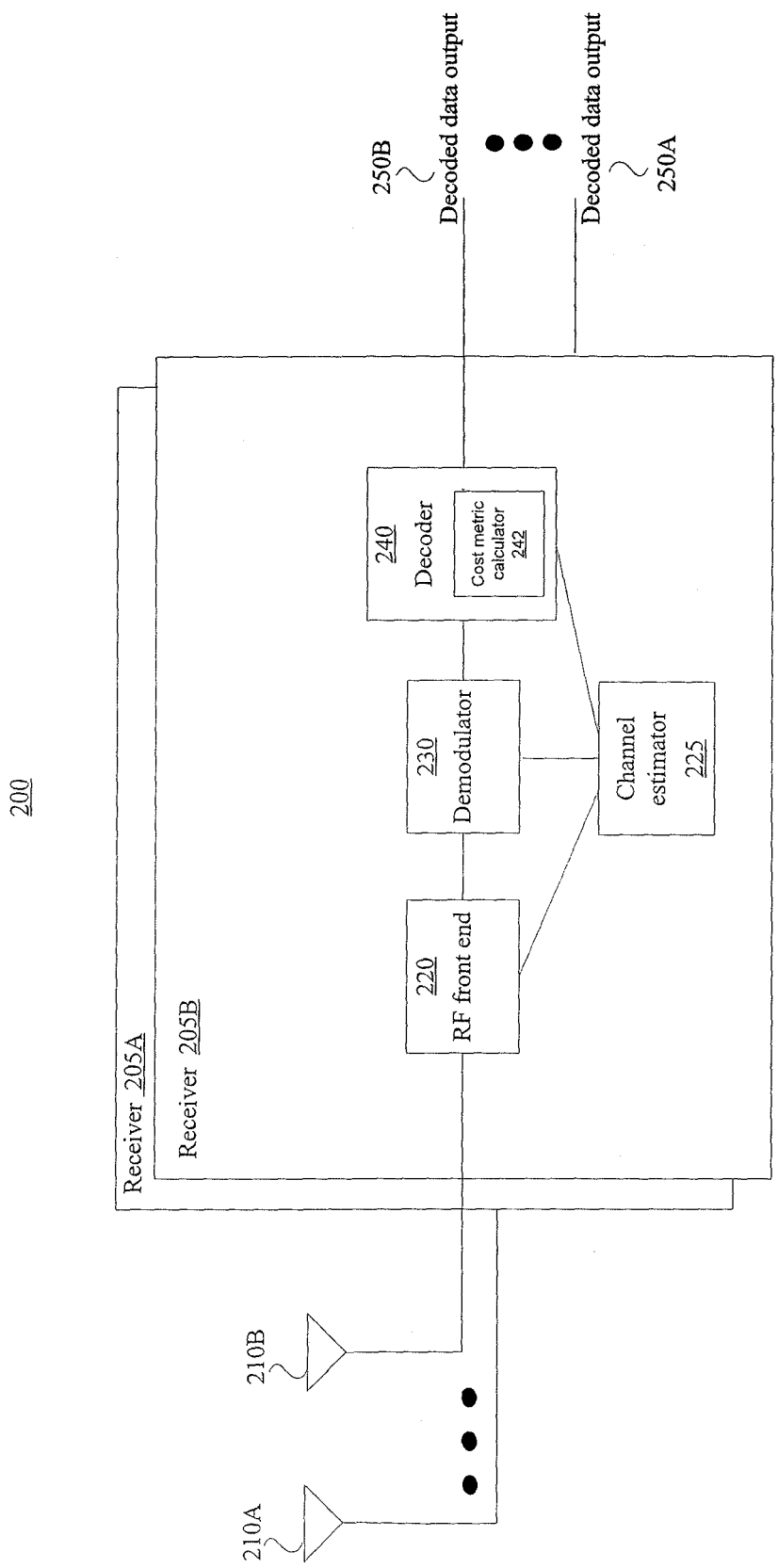
FIG. 2 depicts an example of a block diagram of a system for decoding based on a cost metric.

FIG. 2 depicts an example of a system 200. The system 200 may include a plurality of antennas 210A-B coupled to a plurality of receivers 205A-B. The antennas 210A-B may be implemented in accordance with MIMO, although non-MIMO implementations may be used as well. In the case of MIMO, the antennas 210A-B may be coupled to a plurality of receivers 205A-B to produce a plurality of outputs 250A-B (labeled decoded data outputs).

Receivers 205A-B may each further include a radio frequency (RF) front end 220, a demodulator 230, a channel estimator 225, and a decoder 240, each shown associated with receiver 205B. Only receiver 205B will be described in the foregoing, but the same description may be applied to any of the plurality of receivers.

The RF front end 220 may be configured to down convert a received signal obtained via an antenna, such as antenna 210B, to another signal, such as a baseband signal or intermediate frequency signal. The RF front end 220 may also provide signal conditioning before passing the received signal to the demodulator 230. The RF front end 220 may include other components including the following: local oscillators, mixers, filters, low-noise amplifiers, circulators, analog-to-digital converters, and the like.

Demodulator 230 demodulates the signal obtained from the RF front end 220. For example, the demodulator 230 receives the signal obtained from the RF front end 220 and provides a digital representation of the received signal to the decoder 240. The demodulator may be implemented as any type of analog or digital demodulator, and may demodulate the received signal which may include one or more of the following: a phase shift keying (PSK) signal, for example, binary phase-shift keying (BPSK), quadrature phase shift keying (QPSK), 8-PSK, and 16-PSK; an amplitude shift keying signal including amplitude modulation; a frequency shift keying signal; a continuous phase modulated signal; an orthogonal frequency division multiplexing signal; a quadrature amplitude modulated signal; and any other modulation suitable for communications. When demodulation is performed digitally, an analog-to-digital conversion is performed before demodulation. Other implementations may demodulate using analog RF components followed by analog-to-digital conversion. In any case, the demodulator 230 provides to the decoder 240 a digital representation of the received signal.

Channel estimator 225 is configured to determine an estimate of the instantaneous channel and the statistics of the estimation error to provide the determined estimate and statistics to receiver 205B (or a component therein). For example, the channel estimator 225 may determine the channel estimate and estimation error statistical properties, as noted above with respect to 120. In some implementations, the channel estimator 225 may be located in another device.

In some implementations, the decoder 240 is configured to receive the output of the demodulator 230 and is configured to find an output that matches with, for example, maximum likelihood what was likely sent by a transmitter and received as the received signal at 110. The decoder 240 also provides the output data 250B.

In some implementations, the decoder 240 determines the output data 250B using a cost metric, which is used in conjunction with a search process described further below. For example, the decoder 240 including a cost metric calculator 242 may determine, based on the channel estimate, statistical estimate of the channel and/or the received signal, a cost metric used to evaluate the paths through the decision tree. Examples of cost metrics include a nodal metric function, distance metrics, path metrics, etc.

The decoder 240 may use the cost metric calculator 242 to determine the decoded data output 250B that minimizes the cost metric. For example, the cost metric calculator 242 may calculate one or more cost metrics when searching for a solution producing decoded data output 250B that matches with maximum likelihood what was sent by a transmitter. In some implementations, the decoder 240 may use a search process, such as, for example, the search process 330 and/or 500 described below, to determine a path through a decision tree that minimizes the cost metric and provides decoded output data 250B with maximum likelihood.

Figure 3:
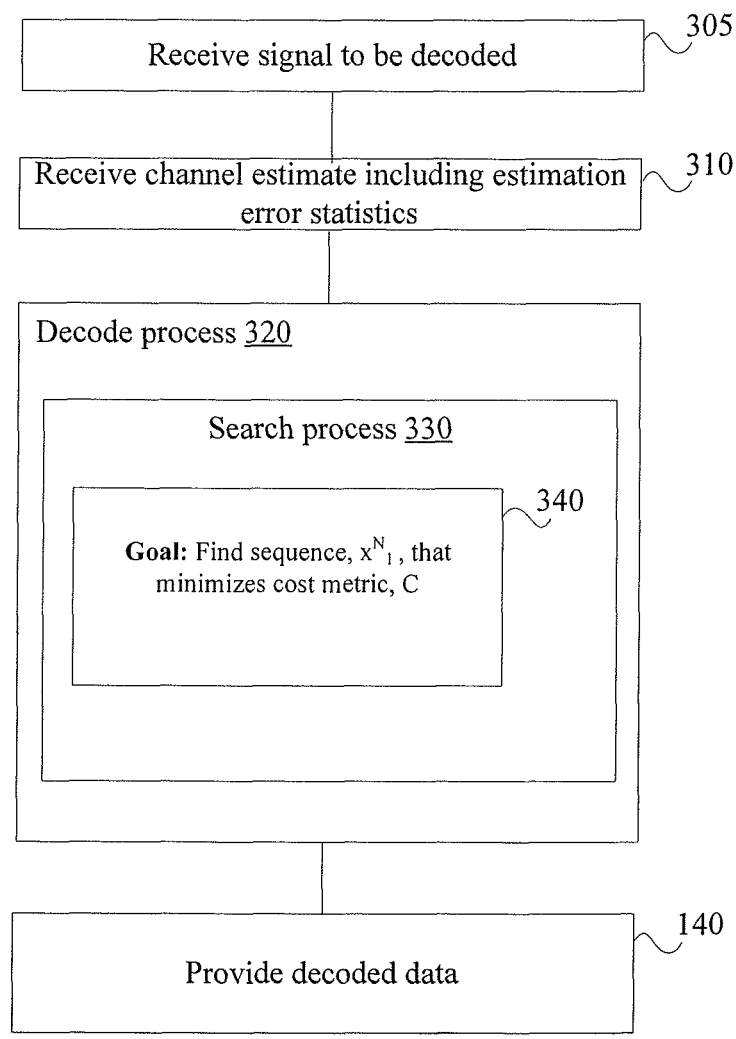
FIG. 3 depicts another example of a process for decoding based on a cost metric.

FIG. 3 depicts an example implementation of a process 300 for decoding. The description of FIG. 3 also refers to FIGS. 1 and 2.

At 305, the decoder 240 may receive a demodulated signal from the demodulator 230, and receive the estimate of the instantaneous channel and statistics of the estimation error determined at 310 from channel estimator 225.

At 320, the decoder 240 may perform a search 330 to determine and select the best path through the decision tree according to a goal 340. In some implementations, the goal 340 may represent the goal of minimizing a cost metric, C, although other goals may be implemented as well. When the search of the paths of the decision tree is complete, the minimum value of the cost metric, $C_{min}$, corresponds to a path with the smallest cost metric. The decoder 240 selects this path as the sequence that best satisfies the goal. The sequence of decoded data is then provided at 140.

To further illustrate the search process 330 and the cost metric used at goal 340, the following provides an illustrative example in the context of MIMO, although other techniques may be used as well. In the following description, vectors and matrices are denoted in bold. The symbols $(\bullet)^T$ and $\|\bullet\|$ denote transposition and Euclidean norm ($\mathcal{L}_2$-norm), respectively. $x_i^N$ denotes a vector $[x_i, x_{i+1}, \ldots, x_N]^T$, and I denotes the identity matrix of appropriate dimension.

For example, a model may be used for a multiple-input multiple-output (MIMO) system. The MIMO model may have the following form:

$$\tilde{y} = \tilde{H}\tilde{x} + \tilde{n} \quad (1)$$

wherein $\tilde{x} = [x_1, x_2, \ldots, x_{N'}]^T$ is a vector of dimension N'×1 representative of a transmitted signal; $x_i$ is drawn from a set $\chi$ of finite cardinality; $\tilde{y} = [y_1, y_2, \ldots, y_{P'}]^T$ is vector of dimension P'×1 representative of a received signal; $\tilde{n} = [n_1, n_2, \ldots, n_{P'}]^T$ is a vector representative of noise; and $\tilde{H}$ is the channel matrix of dimension P'×N' (where P'≥N').

The elements of $\tilde{H}$, $\tilde{x}$, and $\tilde{n}$, are complex values, and the model of Equation (1) above may be represented equivalently in the real domain by the following transformation:

$$\begin{bmatrix} \text{Re}(\tilde{y}) \\ \text{Im}(\tilde{y}) \end{bmatrix} = \begin{bmatrix} \text{Re}(\tilde{H}) & -\text{Im}(\tilde{H}) \\ \text{Im}(\tilde{H}) & \text{Re}(\tilde{H}) \end{bmatrix} \begin{bmatrix} \text{Re}(\tilde{x}) \\ \text{Im}(\tilde{x}) \end{bmatrix} + \begin{bmatrix} \text{Re}(\tilde{n}) \\ \text{Im}(\tilde{n}) \end{bmatrix} \quad (2)$$

wherein Re(•) and Im(•) denote the real and imaginary components, respectively. Letting y, H, x and n denote the first, second, third and fourth terms of Equation (2) respectively, the equivalent real system model, y=Hx+n, is obtained. In this representation, the dimensionality of the system vectors are doubled, i.e., P=2P' and N=2N'. The following description operates using the real domain representation, although other domain representations may be used as well.

In some implementations, the decoder 240 decodes at 320 using a so-called "optimum decoder," such as a maximum likelihood (ML) decoder. Furthermore, if the noise vector, n, is assumed to be Gaussian distributed with a covariance matrix $\sigma_n^2 I$, then the decoder 240 searching 330 according to goal 340 achieves the performance of a maximum likelihood decoder when the combination of the search process 330 and goal 340 of decoder 320 satisfies:

$$\hat{x} = \arg\min_{x \in \chi^N} \|y - Hx\|^2 \quad (3)$$

wherein $\hat{x}$ is the receiver output which is a data sequence that matches the transmitted sequence with maximum likelihood when Equation (3) is satisfied; y is representative of the received signal; H is the estimate of the instantaneous channel; and x is a sequence associated with a candidate path through the decision tree.

When the channel estimate, $\hat{H}$, is not perfect, this estimate may be expressed in terms of a so-called "true" channel matrix H as follows:

$$\hat{H} = H + E \quad (4)$$

wherein E is the channel error matrix. The matrix, E, is a Gaussian random matrix with zero mean. The matrix, E, is also uncorrelated with the transmitted data x and the true channel matrix, H, (i.e., the expected value of $[E^T H]=0$). It is also given that the following expected values are satisfied:

$$E[E_{i,j}^2(H_{i,j})] = \sigma_{E_{i,j}}^2 \quad (5)$$

and $$E[E_{i,j} E_{k,m}] = 0, \text{ if } (i,j) \neq (k,m) \quad (6)$$

wherein, E and H are defined above, and $\sigma_{E_{i,j}}$ is the variance of the estimation error of the estimated channel matrix, H. Thus, for each entry of the estimated channel matrix H (i.e., each matrix entry (i,j)) there is an estimation error associated with it. Equation (5) states that the estimation error variance is different for every matrix entry (i,j). Equation (6) states that the estimation error for matrix entry (i,j) (which is a random variable) is uncorrelated with the estimation error for entry (k,m) (i.e., for k≠i, and m≠j).

Moreover, the signal-to-interference-plus-noise ratio (SINR) may be defined according to the following equation:

$$\overline{\sigma}_E^2 = \frac{1}{PN} \sum_{i,j} \sigma_{E_{i,j}}^2 \quad (7A)$$

leading to $$SINR = \frac{P\overline{\mathcal{E}}_x E[H_{i,j}^2]}{P\overline{\mathcal{E}}_x \overline{\sigma}_E^2 + \sigma_n^2} \quad (7B)$$

wherein P is defined above; $\overline{\mathcal{E}}_x$ is the average energy per transmitted symbol; $\overline{\sigma}_E^2$ is the average variance of E as given by Equation 7A; and $\sigma_n^2$ is the variance of the Gaussian noise. Equation (7B) represents a definition for the signal-to-interference-plus-noise ratio; the numerator of Equation (7B) represents the average received signal power; and the denominator of Equation (7B) is the sum of the average received interference power and the noise power. And, the interference power may depend on the channel estimation error.

Given that the channel error matrix, E, may be considered Gaussian with zero mean and second-order statistics in Equations (5) and (6), the maximum likelihood decoding at 320 may be implemented based on the following equations:

$$\hat{x}_{ML} = \arg\max_{x \in \chi^N} Pr(y \mid \hat{H}, x) \quad (8)$$

wherein $$y \mid \hat{H}, x \sim \mathcal{N}(\hat{H}x, \Sigma) \quad (9)$$

and $$\sum_{i,j} = \begin{cases} \sigma_n^2 + \sum_{k=1}^{N} \sigma_{E_{k,i}}^2 |x_k|^2, & \text{if } i = j; \\ 0, & \text{otherwise} \end{cases} \quad (10)$$

wherein $\mathcal{N}(\hat{H}x, \Sigma)$ denotes a Gaussian distribution with mean, $\hat{H}x$, and covariance $\Sigma$. Combining Equations (4), (9), and (10), yields $$\hat{x}_{ML} = \arg\max_{x \in \chi^N} \log Pr(y \mid \hat{H}, x) \quad (11)$$

$$= \arg\min_{x \in \chi^N} \left( \sum_{m=1}^{N} \log\left(\sigma_n^2 + \sum_{k=1}^{N} \sigma_{E_{m,k}}^2 |x_k|^2\right) + \sum_{m=1}^{N} \frac{|(y - \hat{H}x)_m|^2}{\left(\sigma_n^2 + \sum_{k=1}^{N} \sigma_{E_{m,k}}^2 |x_k|^2\right)} \right).$$

In Equation (11), the effects of the channel estimation error on the decoding can be seen. The term $\sigma_{E_{m,k}}^2$ appears in the first term as well as in the denominator of the second term. The term $\sigma_{E_{m,k}}^2$ is the variance of the estimation error of the estimate of the instantaneous channel, H. Channel estimation error may be considered a multiplicative effect resulting in a more malevolent contributor to error than noise.

In some implementations, the decoder 240 may search 330 using an exhaustive search. An exhaustive search is one in which every possible path through the decision tree is considered by the search process 330 before a decision is made. For example, if the decoded data sequence is 100 bits of binary long and the modulation is binary, $2^{100}$ paths are considered by the decoder 240 before a decision is made. Moreover, the searching at 340, and in particular the exhaustive searching, may place processing and memory burdens on the decoder 240. Consider for example the following two cases:

1) all $\sigma_{E_{k,m}}^2$ are the same and equal to $\sigma_u^2$
2) the values of $\sigma_{E_{k,m}}^2$ are different.

Case 1 represents an example of decoder 240 implementing a cost metric at goal 340 based on robust sphere decoding in which the estimation error variance, $\sigma_{E_{k,m}}^2$, has the same value for every element (i.e., each (k,m)) of matrix, H. In case 2, the estimation error variance may have more than one value of $\sigma_{E_{k,m}}^2$, as a function of indices k and m.

To the extent that complexity is reduced, the decoder 240 may determine, based on a cost metric and using a recursive search of the decision tree (e.g., a robust sphere decoder), a maximum likelihood decoded data output sequence (which may be provided as decoded output data 140). Specifically, the decoder 240 may recursively search the decision trees to solve Equation (11) exactly for case (1) and an approximate solution for case (2). In case 1, for $\sigma_{E_{m,k}}^2 = \sigma_u^2$, the numerator of the second term of Equation (11) may be equivalently expressed as follows:

$$\|U(x-\check{x})\|^2 \qquad (12)$$

wherein $\check{x} = (\hat{H}^T\hat{H})^{-1}\hat{H}^T y$, and $U^T U = \hat{H}^T\hat{H}$ is the Cholesky decomposition of $\hat{H}$. This may be shown based on the following equations:

$$\|U(x-\check{x})\|^2 = (x-\check{x})^T U^T U (x-\check{x})$$

$$= (x-\check{x})^T (\hat{H}^T\hat{H})(x-\check{x})$$

$$= x^T\hat{H}^T\hat{H}x - 2y^T\hat{H}x + x^T x + y^T\hat{H}(\hat{H}^T\hat{H})^{-1}\hat{H}^T y$$

$$= \|y - \hat{H}x\|^2 \qquad (13).$$

Given that the matrix, U, is an upper triangular matrix with positive elements on its diagonal, Equation (12) may also be express as follows:

$$\sum_{i=1}^{N}\left|\sum_{j=i}^{N} U_{i,j}(x_j - \check{x}_j)\right|^2 = \sum_{i=1}^{N}\lambda_i(x_i) \qquad (14)$$

wherein $$\lambda_i(x_i) = \left|\sum_{j=i}^{N} U_{i,j}(x_j - \check{x}_j)\right|^2.$$

The nodal metric function, $\zeta(x_k^N)$, is an example of a cost metric used by decoder 240 in the search process 330. The nodal metric function may be used in conjunction with the search process 330 to decode the received signal 110 and provide the decoded data output 140. The output of the decoder 240 (which utilizes the nodal metric function and search process 330 satisfying Equation (3)) includes a sequence of data symbols that match the transmitted signal with maximum likelihood. Each symbol corresponds to a branching point in the decision tree. A branch represents a transition from one symbol at one stage of the tree (see, e.g., 420 in FIG. 4) to another symbol at the next stage (see, e.g., 425 in FIG. 4). At the end of each branch is a node (see, e.g., 450 in FIG. 4). The cost metric is thus calculated based on the starting node, the ending node, and the path (or series of branches) chosen to get from the first node to the second node. In some implementations, the cost metric calculations using the tree may be implemented by the decoder 240 using at least one processor and accessing the tree as a data structure stored in at least one memory.

In some implementations, the nodal metric function is used as the cost metric and is defined as:

$$\zeta(x_k^N) = \frac{N}{2}\log\left(\sigma_n^2 + \sigma_u^2\sum_{i=k}^{N}|x_i|^2 + \sigma_u^2(k-1)\eta\right) + \frac{\sum_{i=k}^{N}\lambda_i(x_i)}{2\left(\sigma_n^2 + \sigma_u^2\sum_{i=k}^{N}|x_i|^2 + \sigma_u^2(k-1)\nu\right)} \qquad (15)$$

wherein x is a sequence associated with a candidate path through the decision tree; N denotes the number of transmit (or receive) antennas; k denotes the level in the tree for which the metric is being calculated; $\sigma_n^2$ is the variance of the Gaussian noise; $\sigma_u^2$ is the estimation error variance, which may be assumed to be equal and not dependent on the indices (i,j) of H; and $\eta$ (respectively $\nu$) is the square of the modulus of the data symbol with the smallest (respectively largest) modulus value. In some implementations, the nodal metric function is the cost metric used when searching at 330 for case 1 described above.

The nodal metric function defined at Equation (15) at a particular node, e.g., A, is a lower bound of the metric for all of the nodes belonging to the subtree with root node A. The subtree corresponds to any series of branches emanating from node A.

Referring again to FIG. 3, the decoder 240 may implement the search 330 to search the complete set of paths through the decision tree and then to select a path according to the goal of minimizing the cost metric, such as a nodal metric function. The selected search path corresponds to the decoded data output at 140 of the receiver.

In some implementations, the cost metric can be expressed as follows:

$$C = \zeta(x_k^N) \qquad (16),$$

wherein C is the cost metric; x is a sequence associated with a candidate path through the decision tree; $\zeta$ is the nodal metric function of Equation (15); index k is the level in the tree for which the metric is being calculated; and N is the number of transmit (or receive) antennas.

At 340, the decoder 240 may search 330 according to the goal 340 of minimizing the cost metric, C, since the path through the decision tree corresponding to the minimum value of C represents the transmitted data sequence with maximum likelihood. As the search process proceeds, the minimum cost metric at any point in the search may be represented as $C_{min}$ which may be determined as follows:

$$C_{min} = \min(C_{min}, \zeta(x_1^N)\text{max value}) \qquad (17).$$

The value of $C_{min}$ and the path through the decision tree corresponding to $C_{min}$ may be updated by the decoder 240 during the search process 330 according to Equation (17). Throughout the search process 330, the current value $C_{min}$ and the path through the decision tree are stored in memory.

Referring again to 330, in some implementations, the minimum cost metric (e.g., $C_{min}$) may be initialized at the beginning of a search to a value, such as the maximum value noted in Equation (17) by "max value" indicating that no path through the decision tree has been found. As the search 330 proceeds, at each node and candidate path through the decision tree, a value of the cost metric, C (which in this case equal to the nodal metric function, $\zeta(x_1^N)$) is calculated. If the cost metric, C, for a particular path is lower than the stored value of $C_{min}$, then $C_{min}$ is updated to the new lower value of C and its corresponding path. If the value of C is higher or the same value, the minimum cost metric, $C_{min}$, is not updated and the previous value and path are kept. This continues until the search process is complete. Thus, the decoder 240 determines the minimized cost metric, $C_{min}$, which is used to select the best path through the decision tree. The selected search path is used to determine the most likely signal transmitted by a transmitter and received by the receiver (e.g., at 110). This most likely signal is then provided as decoded data at 140 and 250A-B. The search at 330 may be based on a best-first search algorithm to find the minimum cost metric, $C_{min}$, at Equation (17), although other techniques, such as breadth-first search, depth-first search, tree pruning, and other search techniques, may be used as well.

Case 2 represents the decoder 240 implementing the search 330 when the values of $\theta_{E_{k,m}}^2$ are different. In such implementations, the nodal metric function may be defined based on the following equation:

$$\phi(x_k^N) = \sum_{m=1}^{N} \log\left(\sigma_n^2 + \sum_{i=k}^{N} \sigma_{E_{m,i}}^2 |x_i|^2 + \eta \sum_{i=1}^{k-1} \sigma_{E_{m,i}}^2\right) + \sum_{m=k}^{N} \frac{\lambda_m(x_m)}{\left(\sigma_n^2 + \sum_{i=k}^{N} \sigma_{E_{m,i}}^2 |x_i|^2 + v \sum_{i=1}^{k-1} \sigma_{E_{m,i}}^2\right)} \quad (18)$$

wherein, x is a sequence associated with a candidate path through the decision tree; N denotes the number of transmit (or receive) antennas; k denotes the level in the tree for which the metric is being calculated; $\sigma_n^2$ is the variance of the Gaussian noise; $\sigma_{E_{m,i}}^2$ is the estimation error variance of the (m,k) entry of H. Here, the value of $\sigma_{E_{m,i}}^2$ may be dependent on the indices m and i; and $\eta$ (respectively $v$) is the square of the modulus of the data symbol with the smallest (respectively largest) modulus value. In some implementations of decoder 240 such as in case 2 noted herein, the nodal metric function $\phi(x_k^N)$ may be substituted for the nodal metric function $\zeta(x_k^N)$ used in the cost metric.

In some implementations, the search at 330 performed by the decoder 240 may be optimized using one or more of the following rules:

1). Channel Ordering: When channel ordering is used, the columns of the estimated channel matrix $\hat{H}$ may be ordered according to some criterion, for example in ascending order of the Euclidean norm and/or according to the maximized signal-to-interference ratio (SINR) ordering (e.g., arg max $U_{i,i}$).

2). Search ordering: When search ordering is used, at each step of the recursive search process, the nodal metric function values of the nodes at the $i^{th}$ symbol (also called children nodes) of the search process (e.g. a row of nodes in FIG. 4) may be computed and then ranked in ascending order. The node at the $i^{th}$ symbol with the lowest nodal metric function value may be placed at the top of a stack with the other values pushed below it in ascending order so they can be revisited at a later stage.

3). Update the minimum cost metric: When the minimum cost metric is updated, the minimum cost metric may be initialized to $C_{min}$=max value at the start of the search process. Each time the search arrives at the stage i=1, if the value of C is less than the minimum cost metric $C_{min}$, the value of $C_{min}$ may be updated to the lower value C.

4). Truncation: When truncation is used, at each step of the recursive search process, if the nodal metric function value of a child node exceeds $C_{min}$, then the entire subtree belonging to that children node may be discarded since the solution will not lie in that subtree.

Figure 4:
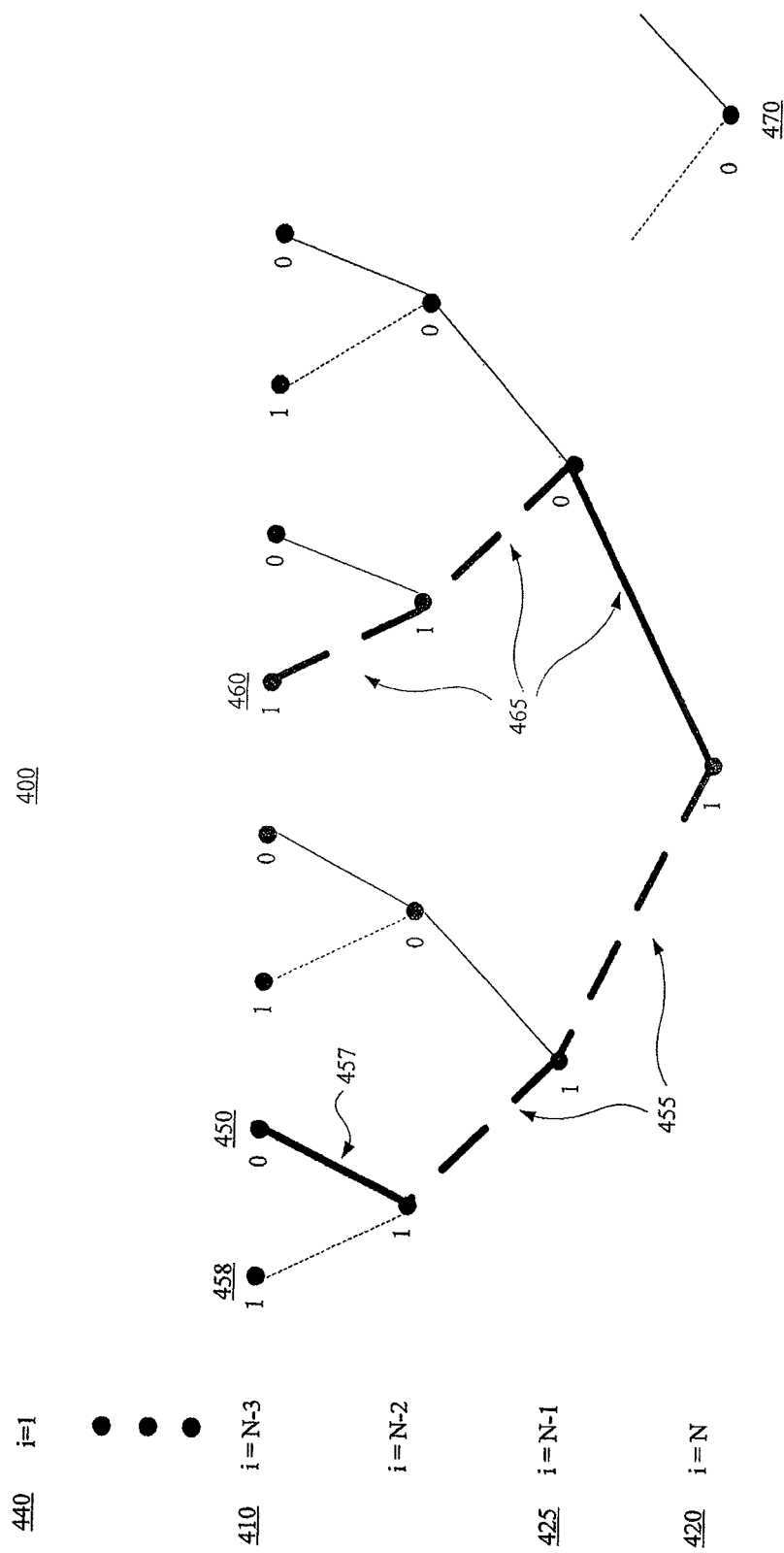
FIG. 4 depicts an example of a decision tree through which a decoder chooses a likely path.

FIG. 4 depicts an example decision tree for illustrative purposes. The decision tree is used to graphically depict the searches 330 performed by the decoder 240 to select the minimum cost path using the goal of minimizing the cost metric at 340 to determine the maximum likelihood data, or the decoded data, output by the decoder 240.

In this example, between the $N^{th}$ symbol and the (N−3) symbol, the decode process 240 must choose one path among the 16 paths through the decision tree 400 that minimizes the cost metric, C, such as the cost metric determined above with respect to Equations (16)-(18). Only half of the decision tree corresponding to $N^{th}$ symbol being a "1" is shown for simplicity, but an identical subtree between i=N−1 and i=1 is present above the $N^{th}$ symbol being a "0" at 470. Upon completion of the search process through tree 400, the decode process 240 may select, for example, a best path which minimizes the cost metric, C, through the tree between stages corresponding to index, i=1 at 440 and i=N at 420. The cost metric through a portion of the tree 400, or subtree, between index i=N and i=N−3 can be expressed as a nodal metric function such as in Equations (15) and (18), for a path corresponding to the data sequence $x_{N-3}^N$ described below.

In this example the four stages of the decision tree 400 from stage i=N−3 at 410 to stage i=N at 420 are shown for $|\chi|$=2 at 430. The stages represent successive symbols in the decode process, $\chi$ is the set of possible states for each symbol, and $|\chi|$ is the number of states in $\chi$. In this example, since $|\chi|$ was chosen to be 2, the two states can be labeled "0" for one of the states and the "1" for the other state. The objective of the decode process is to choose the best path through the portion of the tree from stage i=N to i=N−3. Next, the decoder 240 chooses the best path through the tree from i=N all the way to i=1 (but for illustrative purposes in this example only a portion of the tree, or subtree, from i=N−1 to i=N−3 is considered). A path represents the succession choices made by the decoder 240 when decoding 320 about the succession of symbols in the received signal. 455 and 457 together represent one path from i=N to i=N−3, and 465 represents another path. In this example, there are 16 possible paths from i=N to i=N−3, but for simplicity 8 of the 16 are shown in FIG. 4 corresponding to the subtrees that are possible after making the choice that the symbol at i=N is a "1."

If the minimum cost through the tree 400 between index i=N and i=N−3 happens to end at 450, path 455 followed by 457 corresponds to $C_{min}$ and a maximum likelihood decoded data sequence $x_{N-3}^N$=$[0,1,1,1]^T$. If instead, node 460 happens to minimize the cost, then path 465 corresponds to $C_{min}$ and a maximum likelihood decoded data sequence of $x_{N-3}^N$=$[1,1,0,1]^T$.

Figure 5:
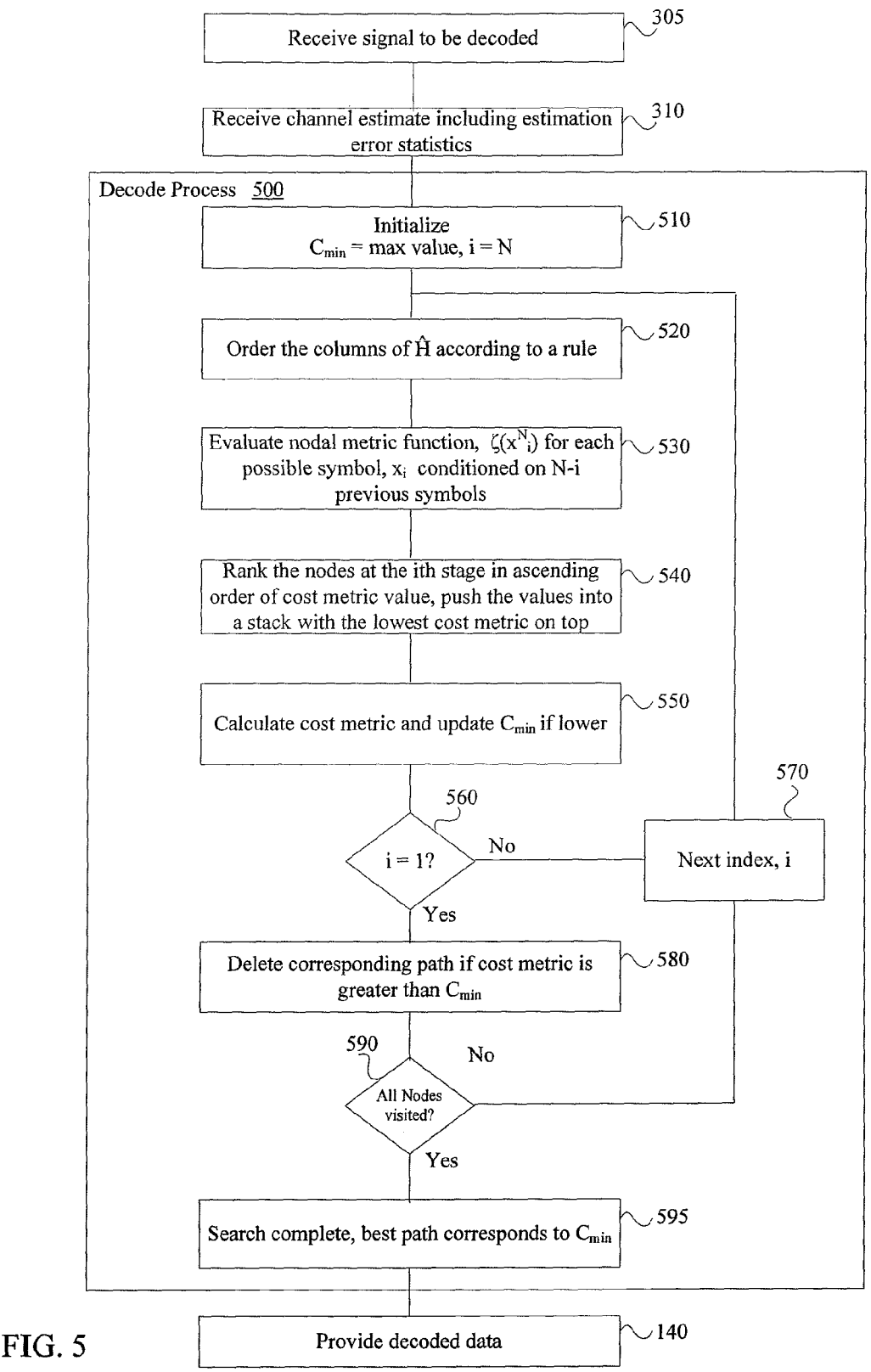
FIG. 5 depicts an example of a process for decoding based on a cost metric implemented as a nodal metric function.

FIG. 5 depicts an example of a process 500 which may be implemented at a decoder, such as decoder 240 of receiver 205A and/or 205B. The decoder 240 may implement a search process, such as a best-first search algorithm, using the nodal metric function, $\zeta(x_1^N)$, as the cost metric to determine the minimum cost path through the decision tree. The description of FIG. 5 also refers to FIGS. 2 and 4.

At 305 and 310, the decoder 240 receives a signal to be decoded and receives an estimate of the instantaneous channel and the statistics of the estimation error, as described above. For example, the decoder 240 may receive a demodulated signal from the demodulator 230, and estimate of the instantaneous channel and statistics of the estimation error from the channel estimator 225. The decoder 240 may decode using, for example, a best-first search algorithm to recursively search the complete set of paths through the decision tree and then select the path according to the goal of minimizing the cost metric, C, such as the nodal metric function (e.g., $C=\zeta(x_1^N)$), and the like. When the decoder 240 completes the search, the minimum value of the cost metric, $C_{min}$, corresponds to the path with the smallest cost metric, which results in the selection of the path as the sequence of data, or symbols, most likely sent (e.g., with maximum likelihood) by the transmitter and received as the received signal at 110. The decoder 240 may provide this data sequence as output data at 140.

At 510, the minimum value, $C_{min}$, is initialized to a maximum value corresponding to the highest possible cost. This may be the maximum allowable quantized value such as 65,535 for a 16-bit representation. Other representations, resolutions, and max values are possible. A floating-point value could also be used at the cost of additional bits to represent the value. Index, i, is also initialized to the value of N, the maximum index value.

At 520, the columns of the estimated channel matrix, $\hat{H}$, may be ordered according to some criterion, for example in ascending order of the Euclidean norm and/or according to the maximized signal-to-interference (SINR) ordering (e.g., arg max $U_{i,i}$).

At 530, the nodal metric function, $\zeta(x_i^N)$, is calculated for each of the $|\chi|$ possible symbols at the $i^{th}$ stage, $x_i$, conditioned on a hypothesis regarding the N–i previous symbols. In other words, the cost metric for at a node at the $i^{th}$ stage is calculated based on an assumed path from the previous stages corresponding to stages between index i+1, the stage just below the $i^{th}$ stage in the tree, and to the $N^{th}$ stage. For example, in the case shown in FIG. 4, if N=8 at 420, at 410 i=5, and the cost metric at 450 is calculated based on the path 455 between the $8^{th}$ stage and the $5^{th}$ stage and the value of "0" on path 457. Then, for each other possible value of $x_i$, at the $i^{th}$ stage (i.e. "1" at 458) a sequence of recursive steps are executed, each of which is contingent on the hypotheses made previously. The very first calculation is for the $N^{th}$ stage, $\zeta(x_N)$, as N corresponds to the first node to be processed so no hypothesis is required about previous nodes.

At 540, the nodes at the $i^{th}$ stage may be ranked in ascending order of the cost metric and pushed into a stack of stored values with the lowest value on top of the stack. The nodes and paths with values higher than the minimum of the group may be used later. For example, in the example of FIG. 4, if the minimum cost metric corresponded to node 450 and the path below it to the $N^{th}$ node, then the cost metric corresponding to it would be on top of the stack. If 460 corresponded to the second lowest cost metric, it would be placed second from the top in the stack.

At 550, the cost metric in 540 is compared to $C_{min}$. If the cost metric in 540 is lower, the minimum cost metric value, $C_{min}$, is replaced with the lower value, and the path through the decision tree to that point becomes the new path associated with the new lower $C_{min}$. For example, the decoder 240 may determine a cost metric, $\zeta(x_i^N)$, as described above with respect to Equations (15) and (16). If the decoder 240 determines that the path at the $i^{th}$ stage with the lowest cost metric is lower than the previous lowest cost metric and path, then the minimum cost metric value, $C_{min}$, is replaced with the new lower value and its corresponding path.

At 560, the index, i, which is updated with each loop of the process, is compared to the value of 1. If the index i does not equal 1 (i.e., i≠1), then the next index value becomes i–1 at 570. If the index, i=1, and the corresponding path has a higher cost value at 580 than $C_{min}$, then the entire path through the tree corresponding to that path is deleted.

At 590, if all of the nodes of the decision tree have been evaluated in the search process, the search is complete at 595. If not all of the nodes have been evaluated, the next index value is determined at 570. When the search is complete, the path corresponding to the lowest cost metric, $C_{min}$, is a maximum likelihood estimate of the transmitted data (which corresponds to what is received as the received signal at 110). At 140, the decoder 240 provides the maximum likelihood estimate as the decoded output data provided at 140.

The subject matter described herein may be embodied in a system, apparatus, method, and/or article depending on the desired configuration. For example, the decoder described herein and/or the processes described herein may be implemented using one or more of the following: at least one processor and at least one memory configured to allow the at least one processor to execute program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) may include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although the description herein refers to processes using minimums, maximums, and best values, the processes described herein may use other values as well, such as values about the minimum, values about the maximum, optimum values, and/or other appropriate values.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
receiving a signal transmitted through a channel;
receiving an estimate of the channel;
determining from the estimate of the channel at least one statistic representative of a variability of the estimate of the channel;
decoding the received signal by at least searching for an output using a plurality of cost metrics determined based on at least the estimate of the channel and the at least one statistic, wherein at least one of the plurality of cost metrics is determined as a nodal metric function, wherein a value of the nodal metric function is based on at least a variance of an estimation error representative of the variability of the estimate of the channel; and
providing, based on at least one of the plurality of cost metrics, the output.

2. The method of claim 1, further comprising:
determining the estimate of the channel.

3. The method of claim 1, further comprising:
determining the variability of the estimate of the channel as a variance.

4. The method of claim 1, wherein the at least one statistic comprises at least one of a mean and a variance.

5. The method of claim 1, wherein the signal is received as a multiple-input multiple-output signal, and wherein the multiple-input multiple-output signal comprises data transmitted through the channel comprising a radio frequency channel.

6. The method of claim 1 further comprising:
calculating the nodal metric function based on the following equation:

$$\phi(x_k^N) = \sum_{m=1}^{N} \log\left(\sigma_n^2 + \sum_{i=k}^{N} \sigma_{E_{m,i}}^2 |x_i|^2 + \eta \sum_{i=1}^{k-1} \sigma_{E_{m,i}}^2\right) +$$

$$\sum_{m=k}^{N} \frac{\lambda_m(x_m)}{\left(\sigma_n^2 + \sum_{i=k}^{N} \sigma_{E_{m,i}}^2 |x_i|^2 + \nu \sum_{i=1}^{k-1} \sigma_{E_{m,i}}^2\right)},$$

wherein x represents a sequence associated with a candidate path through a tree, N represents a quantity of antennas, k represents a level in the tree, $\sigma_n^2$ represents a variance corresponding to noise, and $\sigma_{E_{m,i}}^2$ represents the variance of the estimation error.

7. The method of claim 1, further comprising:
calculating the nodal metric function based on the following equation:

$$\zeta(x_k^N) = \frac{N}{2}\log\left(\sigma_n^2 + \sigma_u^2 \sum_{i=k}^{N} |x_i|^2 + \sigma_u^2(k-1)\eta\right) +$$

$$\frac{\sum_{i=k}^{N} \lambda_i(x_i)}{2\left(\sigma_n^2 + \sigma_u^2 \sum_{i=k}^{N} |x_i|^2 + \sigma_u^2(k-1)\nu\right)}$$

wherein x represents a sequence associated with a candidate path through a tree, N represents a quantity of antennas, k represents a level in the tree, $\sigma_n^2$ represents a variance corresponding to noise, and $\sigma_u^2$ represents the variance of the estimation error.

8. The method of claim 1, wherein decoding further comprises: searching for a cost metric from among the plurality of cost metrics.

9. The method of claim 8, further comprising: selecting the cost metric and a path comprising a data sequence, wherein the output comprises the data sequence.

10. The method of claim 8, wherein the searching comprises a best-first search, wherein the best-first search recursively searches a set of paths through a decision tree to select a path with a minimum value of the nodal metric function.

11. The method of claim 1, wherein the nodal metric function further comprises at least one of a cost metric and a distance metric.

12. An apparatus comprising:
at least one processor configured to provide operations comprising:
receiving a signal transmitted through a channel;
receiving an estimate of the channel;
determining from the estimate of the channel at least one statistic representative of a variability of the estimate of the channel;
decoding the received signal by at least searching for an output using a plurality of cost metrics determined based on at least the estimate of the channel and the at least one statistic, wherein at least one of the plurality of cost metrics is determined as a nodal metric function, wherein a value of the nodal metric function is based on at least a variance of an estimation error representative of the variability of the estimate of the channel; and
providing, based on at least one of the plurality of cost metrics, the output.

13. The apparatus of claim 12, further comprising: determining the estimate of the channel.

14. The apparatus of claim 12, further comprising:
determining the variability of the estimate of the channel as a variance.

15. The apparatus of claim 12, wherein the at least one statistic comprises at least one of a mean and a variance.

16. The apparatus of claim 12, wherein the signal is received as a multiple-input multiple-output signal, and wherein the multiple-input multiple-output signal comprises data transmitted through the channel comprising a radio frequency channel.

17. A non-transitory computer-readable storage medium including code which when executed by a processor provides operations comprising:
receiving a signal transmitted through a channel;
receiving an estimate of the channel;
determining from the estimate of the channel at least one statistic representative of a variability of the estimate of the channel;
decoding the received signal by at least searching for an output using a plurality of cost metrics determined based on at least the estimate of the channel and the at least one statistic, wherein at least one of the plurality of cost metrics is determined as a nodal metric function, wherein a value of the nodal metric function is based on at least a variance of an estimation error representative of the variability of the estimate of the channel; and
providing, based on at least one of the plurality of cost metrics, the output.

18. The non-transitory computer-readable storage medium of claim 17, further comprising:
   determining the estimate of the channel.

19. The non-transitory computer-readable storage medium of claim 18, further comprising:
   determining the variability of the estimate of the channel as a variance.

* * * * *